United States Patent
Klotz et al.

(10) Patent No.: US 11,743,177 B2
(45) Date of Patent: Aug. 29, 2023

(54) SWITCHING DEVICE, NETWORK ACCESS POINT, SYSTEM, PROCESS AND COMPUTER PROGRAM FOR A SWITCHING DEVICE

(71) Applicant: Drägerwerk AG & Co. KGaA, Lübeck (DE)

(72) Inventors: Tobias Klotz, Lübeck (DE); René Langer, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 0 days.

(21) Appl. No.: 17/177,839

(22) Filed: Feb. 17, 2021

(65) Prior Publication Data

US 2021/0258250 A1    Aug. 19, 2021

(30) Foreign Application Priority Data

Feb. 18, 2020   (DE) ..................... 10 2020 001 035.0

(51) Int. Cl.
*H04L 45/00*    (2022.01)
*H04L 49/40*    (2022.01)

(52) U.S. Cl.
CPC .............. *H04L 45/34* (2013.01); *H04L 49/40* (2013.01)

(58) Field of Classification Search
CPC ......... H04L 45/34; H04L 49/40; H04L 47/00; H04W 40/246
See application file for complete search history.

(56) References Cited

U.S. PATENT DOCUMENTS

| | | | | |
|---|---|---|---|---|
| 7,733,800 | B2 * | 6/2010 | Huibregtse | H04L 61/103 370/254 |
| 8,255,585 | B2 * | 8/2012 | Levin | G06F 13/385 710/16 |
| 9,543,920 | B2 * | 1/2017 | Dicks | H03G 3/341 |
| 10,819,590 | B2 * | 10/2020 | Kirner | H04L 41/0893 |
| 11,178,522 | B2 * | 11/2021 | Kim | H04W 76/11 |
| 2009/0219830 | A1 * | 9/2009 | Venner | H04L 41/0806 370/254 |
| 2010/0246439 | A1 * | 9/2010 | Heath | H04L 65/1053 370/254 |

(Continued)

FOREIGN PATENT DOCUMENTS

| | | |
|---|---|---|
| DE | 102015016403 A1 | 6/2017 |
| EP | 2218214 B1 | 5/2013 |

*Primary Examiner* — Kibrom T Hailu
(74) *Attorney, Agent, or Firm* — McGlew and Tuttle, P.C.

(57) ABSTRACT

Exemplary embodiments pertain to a switching device, to a network access point, to a system, to a process and to a computer program for a switching device. The switching device (10) for coupling a network (200) and a medical device (300) comprises a first interface (12) for the communication with the network (200) and a second interface (14) for the communication with the medical device (300). The switching device 10 further comprises a control module (16) for controlling the first and second interfaces (12; 14). The control module (16) is configured to send data packets between the network (200) and the medical device (300) via the first and second interfaces (12; 14) and to send location information of the switching device (10) to the medical device (300) at regular intervals. The control module (16) is configured to send the data packets according to a permanently predefined switching instruction.

19 Claims, 5 Drawing Sheets

(56) References Cited

U.S. PATENT DOCUMENTS

2013/0058335 A1* 3/2013 Koponen .............. H04L 45/74
370/392
2019/0327161 A1* 10/2019 Cannell .............. H04L 43/0817

* cited by examiner

SWITCHING DEVICE, NETWORK ACCESS POINT, SYSTEM, PROCESS AND COMPUTER PROGRAM FOR A SWITCHING DEVICE

CROSS REFERENCE TO RELATED APPLICATIONS

This application claims the benefit of priority under 35 U.S.C. § 119 of German Application 10 2020 001 035.0, filed Feb. 18, 2020, the entire contents of which are incorporated herein by reference.

TECHNICAL FIELD

The present invention pertains to a switching device, to a network access point, to a system, to a process and to a computer program for a switching device, but especially, but not exclusively, to a concept for the automated provision of location information to a medical device.

TECHNICAL BACKGROUND

The networking of medical devices plays an ever-increasing role in clinical settings. For example, many different medical devices are now used for patient monitoring. Examples of such medical devices are devices for monitoring vital parameters, for example, pulse, blood pressure, oxygen saturation, hemodynamic monitoring, ventilators, devices for monitoring a gas concentration in the breath of the patient, devices for administering drugs, etc. These devices are increasingly networked among one another, so that detected information can be exchanged among the devices and be analyzed.

The SDC (Service Device Connectivity) standard introduced in 2019, which is defined in the standard group IEEE-11073 (Institute of Electrical and Electronics Engineers), ensures the overarching interoperability of medical devices among manufacturers. Therapy and real time data just as well as device settings and patient information are exchanged in this case between the devices. To establish the connection of a plurality of devices, it must be ensured that all devices are operating at the same patient. As there is no direct connection between the devices, the assignment must be carried out externally. One approach in this case is the insertion of location information via the network interface already present at the device. Standardized protocols may be used for this purpose.

So-called switches (e.g., network switches), which switch data packets between a plurality of connected network devices, are known from the conventional network technology. For example, there are LAN (Local Area Network) switches, which are approved especially for use in clinical infrastructures, and they can be configured such that location information is sent to the connected devices. These configurable switches are also called managed switches, whose integration into an existing IT (information technology) infrastructure is often undesirable. The integration of a new type of switch is declined by most operator organizations, because this causes increased maintenance efforts. Many organizations prefer a centralized switch infrastructure in central distributor rooms because of the simpler management. The costs per network socket are, furthermore, higher in the case of the above-mentioned switches than in the case of comparable IT solutions.

Another possibility is the entry of the location information by means of a user input in a dialogue window at the medical device itself. However, this solution may compromise the usability of the device. Since an additional working step is necessary in this case for the operating staff, it can be assumed that the functions that are made available by SDC are not utilized due to the resulting extra effort.

SUMMARY

Against this background, there is therefore a need to create an improved concept for providing location information for a medical device.

Exemplary embodiments are based on the core idea of providing location information for medical devices in an automated manner via a switching device. The switching device may be located in this case between a medical device and a network and insert the location information. A possible effort that might be needed for configuration by the operating staff at the medical device and also an effort for configuration on the network side are eliminated. The switching device itself may in this case be set permanently and possibly also installed, so that medical devices connected via the switching device always receive the same location information.

Exemplary embodiments create a switching device for coupling a medical device and a network. The switching device comprises a first interface for the communication with the network and a second interface for the communication with the medical device. The switching device further comprises a control module for controlling the first and second interfaces, the control module being configured to switch data packets between the network and the medical device via the first interface and the second interface. The control module is further configured to send location information of the switching device to the medical device at regular intervals in order to switch the data packets according to a permanently predefined switching protocol. Exemplary embodiments can thus ensure the provision of the location information via the switching device without an effort needed for configuration arising on the network side or on the device side.

The control module may be configured in at least some exemplary embodiments to make the switching device appear transparent in relation to the network. The transparency of the switching device may help keep the management effort low on the network side. The transparency may be achieved, for example, by the signal processing in the switching device being limited to the lower protocol layers, e.g., layers 1 and 2. Starting from the protocol layers 3 and higher, the switching device is then unrecognizable and is transparent in this sense. Transparency thus means invisibility beginning from a certain protocol layer.

The control module may be configured in some exemplary embodiments to communicate on a first and/or second protocol layer via the first interface and via the second interface. The complexity of the switching device can be kept low in exemplary embodiments by the switching device being configured for communication on the lower protocol layers. The control module may be configured in this case to communicate the location information of the switching device on the first and/or second protocol layers. In this case, a signal processing may be dispensed with on the higher protocol layers within the switching device. The location information of the switching device may be communicated as control information of a protocol on the first and/or second protocol layers. For example, the location information may be communicated to the medical device via the Link Layer Discovery Protocol, LLDP. Exemplary embodiments may thus make use of a standardized protocol on the lower protocol levels to communicate the location information.

In other exemplary embodiments, the first interface may be configured for the communication with a network access point. For example, standardized access interfaces, e.g., RJ45 (Registered Jack, Ethernet) may be used in this case. The control module may be configured to switch the data packets without managing an internet protocol address, IP address, or media access control address (MAC address), of its own. This contributes to the transparency of the switching device in the rest of the network. The location information may also be obtained via a third interface in some exemplary embodiments. In this case, the switching device can receive the location information via this third interface and it can send it to the medical device. For example, the third interface may be a Universal Serial Bus interface (USB interface). Exemplary embodiments can thus make possible a simple connection of the switching device to the network and/or to a user terminal according to the standards.

The switching device may be supplied with power in at least some exemplary embodiments via the network and/or via the medical device. The switching device may not need a power supply of its own at all in this case. A separate power pack or another kind of power supply, e.g., via a battery, can thus be eliminated. In other exemplary embodiments, the switching device may be supplied with power via a battery, so that at least one power pack can be eliminated.

A network access point with a switching device according to the above description is another exemplary embodiment. A connection to the network access point may be established via the switching device, so that provision of the location information is guaranteed in case of each connection to the access point. The switching device may be permanently integrated in this case in the network access point. Inseparability of the access point and of the switching device can be favorable for continuously providing the location information to connected medical devices.

Another exemplary embodiment is a system with a network access point according to the above description, with one or more medical devices and with a server. Such a system can contribute to the consistent provision of location information for medical devices, for example, in hospitals. For example, the one or more medical devices and the server may be configured to exchange information related to a patient. It can be ensured by the location information available at the participating devices that information on the same patient is exchanged.

A process for a switching device for coupling a medical device and a network is another exemplary embodiment. The process comprises a switching of data packets between the network and the medical device according to a permanently predefined switching instruction and a regular transmission of location information of the switching device to the medical device.

Another exemplary embodiment is a computer program with a program code for carrying out a process being described in this case when the program code is being executed on a computer, on a processor or on a programmable hardware component.

Some examples of devices and/or processes will be explained in more detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
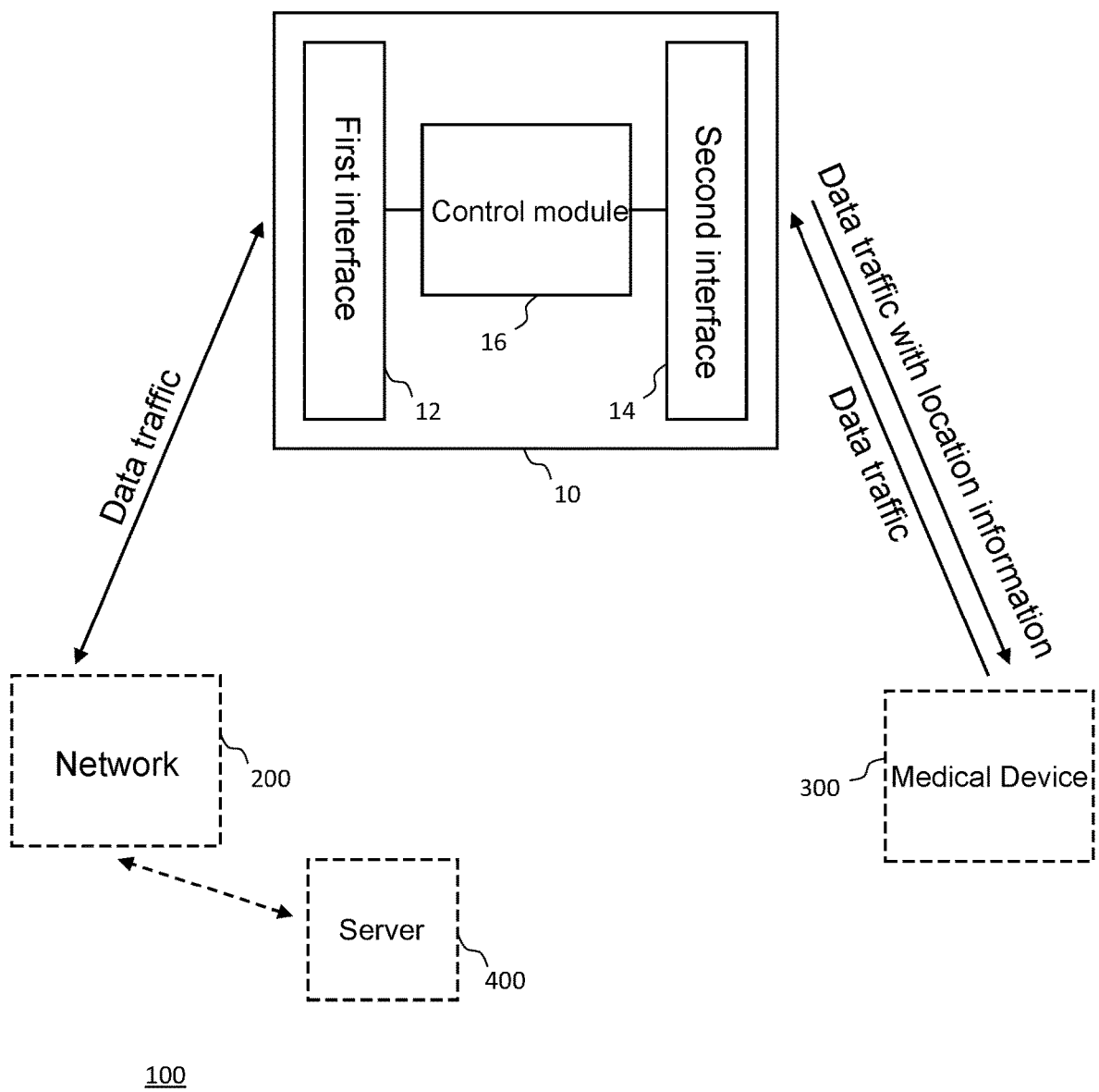
FIG. 1 is a block diagram of an exemplary embodiment of a switching device and of an exemplary embodiment of a system.

Referring to the drawings, various examples will be described in more detail with reference to the attached figures. The thicknesses of lines, layers and/or areas may be exaggerated in the figures for illustration.

Further examples may cover modifications, correspondences and alternatives, which fall within the scope of the disclosure. Identical or similar reference numbers pertain in the entire description of the figures to identical or similar elements, which may be implemented identically or in a modified form in a comparison with one another, while they provide the same function or a similar function.

It is apparent that when an element is described as being "connected" to or "coupled" with another element, the elements may be connected or coupled directly, or via one or more intermediate elements. If two elements A and B are combined with the use of an "or," this shall be understood such that all possible combinations are disclosed, i.e., A only, B only as well as A and B, unless something different is explicitly or implicitly defined. An alternative wording for the same combinations is "at least one of A and B" or "A and/or B." The same applies, mutatis mutandis, to combinations of more than two elements.

FIG. 1 shows a block diagram of an exemplary embodiment of a switching device 10 and of an exemplary embodiment of a system 100. The switching device 10 is configured for coupling a medical device 300 and a network 200. The switching device 10 comprises a first interface 12 for the communication with the network 200. The switching device 10 comprises, furthermore, a second interface 14 for the communication with the medical device 300. As is also shown in FIG. 1, the switching device 10 comprises, moreover, a control module (controller) 16, which is coupled with the first interface 12 and with the second interface 14. The control module 16 is configured for controlling the first interface 12 and the second interface 14. The control module 16 is configured, moreover, to switch data packets between the network 200 and the medical device 300 via the first interface 12 and via the second interface 14 and to send location information of the switching device 10 to the medical device 300 at regular intervals. The control module 16 is configured to send the data packets according to a permanently predefined switching instruction.

The first interface 12 and/or the second interface 14 may be configured in exemplary embodiments as typical interfaces for the communication in networks. For example, these may be configured as corresponding contacts in exemplary embodiments. They may also be configured in exemplary embodiments as separate hardware. They may comprise memories, which store the signals to be sent and the received signals at least temporarily. The interfaces 12, 14 may be configured to receive electrical signals, for example, as a bus interface, as an optical interface, as an Ethernet interface, as a wireless interface, etc. Moreover, they may also be configured in exemplary embodiments for wireless transmission and comprise an RF front end as well as corresponding antennas. Further, they may comprise synchronization mechanisms for synchronization with the respective transmission medium for the one or more types of connection.

The control module 16 may comprise in exemplary embodiments one or more controllers of any kind, microcontrollers, network processors, processor cores, such as digital signal processor cores (DSPs), and programmable hardware components. Exemplary embodiments are not limited to a certain type of processor core. Any desired processor cores or even a plurality of processor cores or microcontrollers may be provided for implementing the control module 16. Implementations in an integrated form with other devices is a further alternative, for example, in a control unit that additionally also comprises one or more other functions. In exemplary embodiments, the control module 16 may be embodied by a processor core, by a computer processor core (CPU=Central Processing Unit), by a graphics processor core (GPU=Graphics Processing Unit), by an application-specific, integrated circuit core (ASIC=Application-Specific Integrated Circuit), by an integrated circuit (IC=Integrated Circuit), by a one-chip system core (SOC=System on Chip), by a programmable logic element or by a field-programmable gate array with a microprocessor (FPGA=Field Programmable Gate Array) as a core of the component or of the components.

The function of the control module 16 in the exemplary embodiments is the sending/switching of packet data traffic between the network 200 and the medical device 300 via the first and second interfaces 12, 14, respectively. The control module 16 regularly inserts location information, which can be read and interpreted by the medical device 300, into packets that are sent to the medical device 300. The sending therefore takes place according to a permanently predefined instruction, and the switching device 10 is unmanaged in this sense. The insertion of the location information may be effected, for example, by corresponding information being inserted into a protocol field intended for this purpose.

An example of such a switching instruction is a rigid assignment:
1. Packets received via the first interface 12 are outputted via the second interface 14, and these packets are regularly manipulated by the insertion of the location information (e.g., in a protocol field), and
2. packets received via the second interface 14 are outputted unchanged via the first interface 12.

The location information itself may comprise in this case coordinates, location data in a hospital (ward number, room number, bed number), etc. The location information will typically correspond to a coded bit sequence, which can be interpreted within the framework of a protocol. Thus, it is possible to select in the scenario (hospital) outlined above location information that is unambiguous within the framework of the environment, and which is also as short as possible, representing, e.g., an unambiguous identification of the bed, of the room and of the ward, but not the hospital, since all locations are in the same hospital anyway.

FIG. 1 shows, moreover, some components, which are optional from the viewpoint of the switching device 10, and which are represented by means of broken lines. These represent synoptically an exemplary embodiment of a system 100, which also comprises at least one medical device 300 and at least one server 400, in addition to the switching device 10. The server 400 may be a data server, which manages data for the medical device 300, i.e., for example, receives data and stores same or sends data to the medical device 300. The one or more medical devices 300 and the server 400 may be configured to exchange information concerning a patient. The system 100 comprises, furthermore, an access point for the network 200, which will be explained in more detail below.

In some exemplary embodiments, the assignment of the location information may be carried out without user interaction, i.e., without interaction with the health care staff, in order to prevent operating errors. For example, the location information may be set initially once at the time of the installation of the switching device 10 by IT specialists. As long as the switching device 10 remains at its location, there will not then be any need for changing the location information. The control module 16 may be configured to receive the location information via a third interface 18, for example, at the time of the initial set-up. An example of this third interface 18 is a Universal Serial Bus interface, USB interface.

Figure 2:
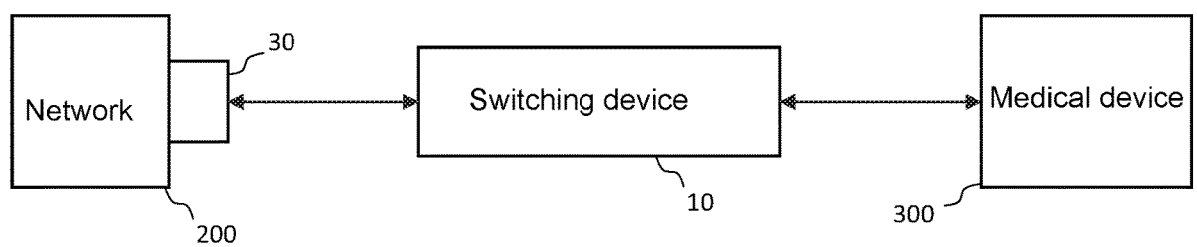
FIG. 2 is a schematic view of an exemplary embodiment of a network access point with a switching device in a network environment.
Figure 3:
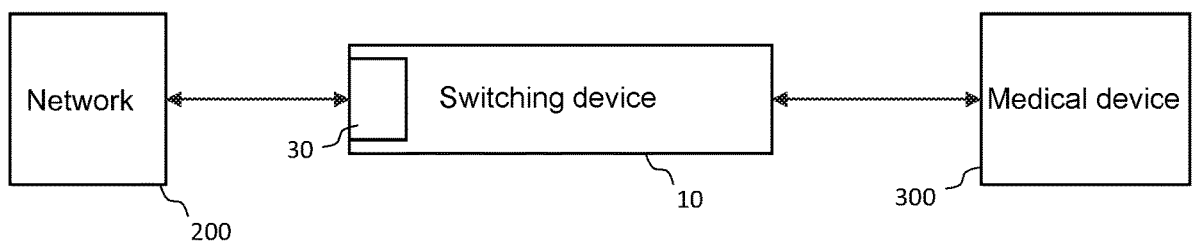
FIG. 3 is a schematic view of an exemplary embodiment of a network access point with an integrated switching device in a network environment.

The further assignment of the location information can be carried out by means of a hardware feature, which is arranged directly at a network access point. FIG. 2 shows an exemplary embodiment of a network access point 30 with a switching device 10 in a network environment 100. FIG. 2 shows the network 200 with a network access point 30. The network access point 30 may be, for example, a network socket, which is connected correspondingly, and makes access possible to an Intranet and/or to the Internet, e.g., a RJ 45 jack interface. In the exemplary embodiment shown in FIG. 2, the switching device 10 is connected to the network 200 via a corresponding connection, e.g., patch cable or in a wireless manner. As was already explained above, the connections shown in the figures do not necessarily have to be cable connections, but they may also be embodied via corresponding wireless interfaces. Examples are Wireless LAN, Bluetooth, Near Field Communication (NFC), mobile phone network, etc. FIG. 2 shows therefore an exemplary embodiment of a network access point 30 with a switching device 10 according to the present description. The first interface 12 is correspondingly configured in this exemplary embodiment for the communication with a network access point 30. FIG. 3 shows an exemplary embodiment of a network access point 30 with an integrated switching device 10 in a network environment 100. Integrated in this case means hardwired. In some exemplary embodiments, integrated even means physically inseparably connected. The switching device 10 may then be integrated in a network socket 30 such that this cannot be recognized any more from the external appearance.

FIG. 3 shows an exemplary embodiment of a network access point 30 with an integrated switching device 10 in a network environment 100. The switching device 10 is permanently integrated in this case in the network access point 30. This can be brought about in the implementation based on the example of a wall socket 30 such that the switching device 10 is not visible from the outside with the wall socket 30 mounted. The internal integration may be brought about in this case in the form of a plug-type connection or of another connection.

The assignment of the location information to a medical device 300 may be carried out independently from the particular device 300. An additional management of the inserted hardware may possibly even be able to be reduced to a minimum hereby. The control module 16 in the switching device 10 may be configured to make the switching device 10 appear transparent in relation to the network 200. The transparency may relate in this case to higher protocol layers, for example, beginning from layer 3/switching layer, e.g., Internet protocol (IP). Accordingly, the control module 16 may be configured at least in such an exemplary embodiment to communicate via the first and second interfaces 12, 14, respectively on a first and/or second protocol layer. This leads to transparency (invisibility) of the switching device 10 in relation to the network infrastructure. This means especially that, aside from a possible first installation at the switching device 10 itself, no additional measures are necessary on the part of the IT network operator for the installation of the solution.

The control module 16 is configured in this case, for example, to communicate the location information of the switching device 10 on the first and/or second protocol layers. This can be brought about, for example, within the framework of the control information of a protocol on the first and/or second protocol layer.

An exemplary embodiment of the switching device 10 may accordingly correspond to a hardware, which operates in a stationary manner. This hardware sends the necessary location information at periodic intervals to the network interface of a connected, SDC-capable device 300. The layer 2 network protocol LLDP (Link Layer Discovery Protocol) is selected in another exemplary embodiment for the identification of the location information. The control module 16 is then configured to communicate the location information via the Link Layer Discovery Protocol, LLDP, to the medical device 300.

This is possible without compromising the network traffic (data traffic) and can also be supported by other network devices, for example, IP telephones, workstation switches. The LLDP protocol can transport the location information with minimal overhead because it is a Level-2 protocol, so that no IP interaction is necessary. The control module 16 is correspondingly configured in another exemplary embodiment to identify the data packets without managing an Internet protocol address, IP address, or Medium Access Control address, MAC address, of its own.

It is possible as a result to provide a hardware in the form of the switching device 10, which is transparent for the IT infrastructure, while it sends on the device side LLDP packets, which can be used by the medical device 300 for taking over the location information.

In order to reduce an operating error, a wiring may be selected in some exemplary embodiments such that the connection between the LLDP injector (switching device 10) and the network socket 30 cannot be separated from the end user, and a severing of the connection is possible only between the medical device 300 and the LLDP injector (switching device 10).

For the unambiguous identification, the LLDP injector (switching device 10) may further be labeled with its corresponding location (location information). This may be carried out, for example, by correspondingly qualified staff at the time of the first set-up by means of an identification, i.e., a pressure-sensitive adhesive label. In another exemplary embodiment, the switching device 10 corresponds to a switch, which is actuated by a microcontroller (control module 16). The microcontroller sends the location information periodically. The switching device 10 is inserted in this case between the network access point 30 and the medical device 300 and the network switch is configured such that no reaction to the IT network is possible.

Figure 4:
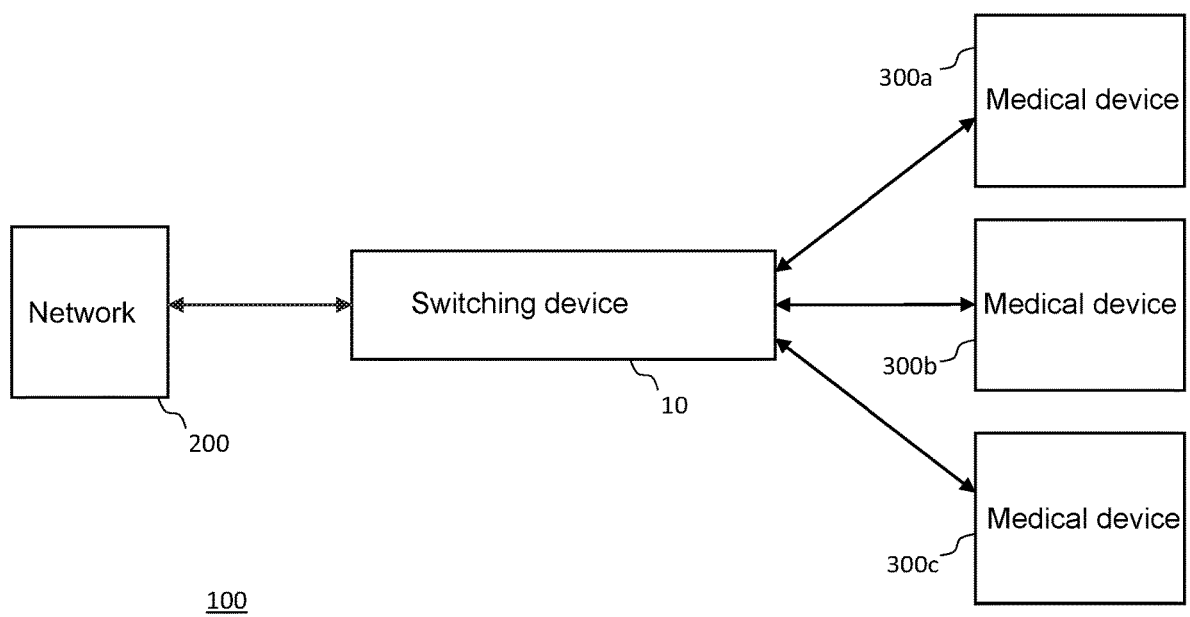
FIG. 4 is a schematic view showing a network scenario with an exemplary embodiment of a switching device with a downstream switch.

FIG. 4 shows a network scenario with an exemplary embodiment of a switching device 10 with a downstream switch. As was described above, the switching device 10 is used in FIG. 4, as was described above, between the network 200 and in this case a plurality of medical devices 300a, 300b, and 300c. Use in an intensive care unit with a plurality of networked transmission devices 300a, 300b, 300c for one patient is conceivable. As is shown in FIG. 4, the switching device 10 may comprise a distribution switch, or it may even be arranged upstream of a switch. The same location information can thus be made available to the medical devices. A possible switch may be integrated in this case into the switching device 10. In another exemplary embodiment, for example, when the switching device 10 is integrated into a network socket 30, a switch of the switching device 10 may also be arranged downstream on the medical device side. The switch in this case switches between the medical devices 300a, 300b, 300c and the second interface 14 of the switching device 10.

The switching device 10 may thus be a switch itself. The switching device 10 does not, however, contain any IP or MAC address of its own, i.e., it is not directly visible in the network 200. The management of the switch does not take place from the outside, but is assumed by the integrated microcontroller (control module 16). In at least some exemplary embodiments, the switching device 10 corresponds to a 1:1 solution, i.e., there is one device 300 per network access point 30. The switching device 10 can thus be more cost effective, for example, compared to 1:4 switches.

As was already described above, an integration into the network access point 30 is possible as an improvement to the solution.

A further improvement in further exemplary embodiments would be in respect to the power supply of the switching device 10. Thus, a power supply of the switching device 10 can be brought about via the network 200 and/or the medical device 300, which can make an external power supply superfluous. For example, this may be embodied by means of Power-Over-Ethernet (PoE). As an alternative or in addition, the power supply of the switching device 10 may be ensured by means of a battery. The very low power demand of the device (switching device 10) may possibly also be covered by an integrated battery or by energy harvesting.

Figure 5:
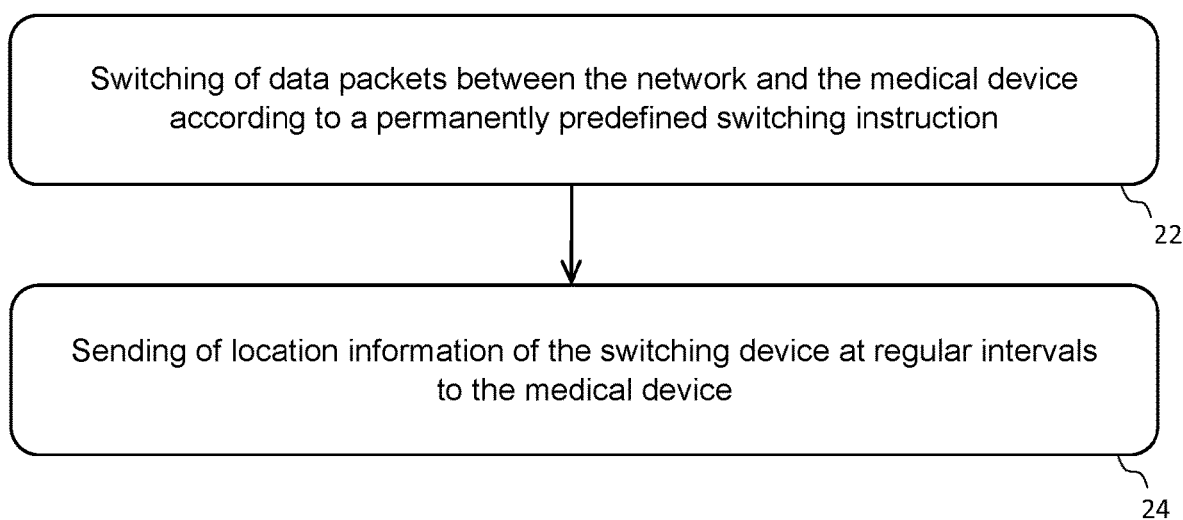
FIG. 5 is a block diagram of an exemplary embodiment of a process for a switching device for coupling a medical device and a network.

FIG. 5 shows a block diagram of an exemplary embodiment of a process 20 for a switching device 10 for coupling a network 200 and a medical device 300. The process 20 comprises a switching 22 of data packets between the network 200 and the medical device 300 according to a permanently predefined switching instruction, and a sending at regular intervals of location information of the switching device 10 to the medical device 300.

Exemplary embodiments may be, furthermore, a computer program with a program code for carrying out one or more of the above processes or they may relate to these when the computer program is executed on a computer or processor. Steps, operations or processes of different, above-described processes may be executed by programmed computers or processors. Examples may also cover program memory devices, e.g., digital data storage media, which are machine-, processor- or computer-readable and code machine-executable, processor-executable or computer-executable programs of instructions. The instructions carry out some or all of the steps of the above-described processes or cause them to be executed. The program memory devices may comprise or be, e.g., digital memories, magnetic storage media, for example, magnetic disks and magnetic tapes, hard drives or optically readable digital data storage media. Further examples may also cover computers, processors or control units, which are programmed for executing the steps of the above-described processes, or are (field)-programmable logic arrays ((F)PLAs=(Field) Programmable Logic Arrays) or (field)-programmable gate arrays ((F)PGA= (Field) Programmable Gate Arrays), which are programmed for executing the steps of the above-described processes.

Functions of various elements shown in the figures as well as the designated functional blocks may be implemented in the form of dedicated hardware, e.g., in the form of "a signal provider," "of a signal processing unit," "of a processor," of a control," etc., as well as hardware capable of executing software in conjunction with corresponding software. In case of provision by a processor, the functions may be provided by an individual dedicated processor, by an individual, jointly used processor or by a plurality of individual processors, some of which or all of which can be used jointly. However, the term "processor" or "control" is far from being limited to hardware capable exclusively of executing software, but it may comprise digital signal processor hardware (DSP hardware; DSP=Digital Signal Processor), network processor, application-specific integrated circuit (ASIC=Application Specific Integrated Circuit), field-programmable logic array (FPGA=Field Programmable Gate Array), read-only memory (ROM=Read Only Memory) for storing software, random access memory (RAM=Random Access Memory) and non-volatile storage device (storage). Other hardware, conventional and/or customer-specific, may be included as well.

A block diagram may represent, for example, an approximate circuit diagram, which implements the principles of the disclosure. In a similar manner, a flow chart, a phase transition diagram, a pseudocode and the like may represent different processes, operations or steps, which are represented, for example, essentially in computer-readable medium and are thus executed by a computer or processor, regardless of whether such a computer or processor is shown explicitly. Processes disclosed in the description or in the patent claims may be implemented by a component, which has a device for executing each of the respective steps of these processes.

It is obvious that the disclosure of a plurality of steps, processes, operations or functions disclosed in the description or in the claims shall not be interpreted as being configured such that they are arranged in the defined sequence, unless this is explicitly or implicitly indicated otherwise, e.g., for technical reasons. Therefore, these are not limited by the disclosure of a plurality of steps or functions to a defined sequence, unless these steps or functions are not interchangeable for technical reasons. Further, an individual step, function, process or operation may include a plurality of partial steps, partial functions, partial processes or partial operations and/or may be divided into these. Such partial steps may be included and be a part of the disclosure, if they are not explicitly excluded.

While specific embodiments of the invention have been shown and described in detail to illustrate the application of the principles of the invention, it will be understood that the invention may be embodied otherwise without departing from such principles.

LIST OF REFERENCE NUMBERS

10 Switching device
12 First interface
14 Second interface
16 Control module
20 Process
22 Switching of data packets between the network and the medical device according to a permanently predefined switching instruction
24 Sending of location information of the switching device to the medical device at regular intervals
100 System
200 Network
300 Medical device
300a Medical device
300b Medical device
300c Medical device
400 Server

What is claimed is:

1. An unmanaged switching device for coupling a network and a medical device, the unmanaged switching device comprising:
   a first interface for communication with the network;
   a second interface for the communication with the medical device; and
   a control module configured:
   to control the first interface and the second interface;
   to switch data packets between the network and the medical device via the first and second interfaces;
   to send predefined hospital location information of the unmanaged switching device to the medical device at regular intervals;
   to switch the data packets according to a permanently predefined switching instruction without managing an internet protocol address (IP address) of the unmanaged switching device;
   to communicate via the first and second interfaces on a first protocol layer or on a second protocol layer or on both a first protocol layer or on a second protocol layer;
   to communicate the predefined hospital location information of the unmanaged switching device on the first protocol layer or on the second protocol layer or on both the first protocol layer or on the second protocol layer;
   to make the switching device appear to be transparent in relation to the network by:
      insertion of the hospital location information in a protocol field of the first or second internet protocol layer in at least some packets received via the first interface and not changing a third switching internet protocol layer or higher internet protocol layer of said at least some packets; and
      receiving packets via the second interface and outputting the received packets unchanged via the first interface.

2. An unmanaged switching device in accordance with claim 1, wherein the control module is configured to communicate the hospital location information of the unmanaged switching device as control information of a protocol on the first protocol layer and/or on the second protocol layer, the hospital location information comprising one or more of a ward number, a room number and a bed number.

3. An unmanaged switching device in accordance with claim 2, wherein the control module is configured to communicate the hospital location information via a Link Layer Discovery Protocol (LLDP) to the medical device.

4. An unmanaged switching device in accordance with claim 1, wherein the first interface is configured for the communication with a network access point.

5. An unmanaged switching device in accordance with claim 1, wherein the control module is configured to receive the hospital location information via a third interface.

6. An unmanaged switching device in accordance with claim 5, wherein the third interface is a universal serial bus interface (USB interface).

7. An unmanaged switching device in accordance with claim 1, wherein a power supply of the unmanaged switching device is comprised by the network and/or the medical device.

8. An unmanaged switching device in accordance with claim 1, wherein a power supply of the unmanaged switching device comprises a battery.

9. An unmanaged switching device in accordance with claim 1, wherein the control module is further configured to receive data packets via the second interface and output the received packets unchanged via the first interface.

10. An unmanaged switching device in accordance with claim 1, wherein the unmanaged switching device cannot be configured through the network.

11. A network access point comprising an unmanaged switching device for coupling a network and a medical device, the unmanaged switching device comprising:
a first interface for communication with the network;
a second interface for the communication with the medical device; and
a control module configured:
to control the first interface and the second interface;
to switch data packets between the network and the medical device via the first and second interfaces;
to send predefined hospital location information of the unmanaged switching device to the medical device at regular intervals;
to switch the data packets according to a permanently predefined switching instruction without managing an internet protocol address (IP address) of the unmanaged switching device, wherein the unmanaged switching device is permanently set for sending the same predefined hospital location information to each of one or more medical devices;
to communicate via the first and second interfaces on a first protocol layer or on a second protocol layer or on both a first protocol layer or on a second protocol layer;
to communicate the predefined hospital location information of the unmanaged switching device on the first protocol layer or on the second protocol layer or on both the first protocol layer or on the second protocol layer;
to make the switching device appear to be transparent in relation to the network by:
insertion of the hospital location information in a protocol field of the first or second internet protocol layer in at least some packets received via the first interface and not changing a third switching internet protocol layer or higher internet protocol layer of said at least some packets; and
receiving packets via the second interface and outputting the received packets unchanged via the first interface.

12. A network access point in accordance with claim 11, wherein the unmanaged switching device is permanently integrated into the network access point, the hospital location information comprising one or more of a ward number, a room number and a bed number.

13. A system comprising:
one or more medical devices;
a server; and
a network access point a switching device for coupling a network and one or more medical devices, the switching device comprising:
a first interface for communication with the network;
a second interface for the communication with the medical device; and
a control module configured:
to control the first interface and the second interface;
to switch data packets between the network and the medical device via the first and second interfaces;
to send hospital location information of the switching device to the medical device at regular intervals;
to switch the data packets according to a permanently predefined switching instruction such that the switching device is permanently set for sending the same hospital location information to each of the one or more medical devices;
to communicate via the first and second interfaces on a first protocol layer or on a second protocol layer or on both a first protocol layer or on a second protocol layer; and
to communicate the hospital location information of the switching device on the first protocol layer or on the second protocol layer or on both the first protocol layer or on the second protocol layer, wherein:
the one or more medical devices and the server are configured to exchange information with data packets comprising patient data;
the control module is configured to make the switching device appear to be transparent in relation to the network by:
insertion of the hospital location information in a protocol field of the first or second internet protocol layer in at least some packets received via the first interface and not changing the third switching internet protocol layer or higher internet protocol layer of said at least some packets; and
receiving packets via the second interface and outputting the received packets unchanged via the first interface.

14. A system in accordance with claim 13, wherein the control module is configured to communicate the hospital location information via a Link Layer Discovery Protocol (LLDP) to the medical device.

15. A system in accordance with claim 13, wherein the control module is configured to switch the data packets without managing an internet protocol address (IP address), or a media access control address (MAC address).

16. A system in accordance with claim 13, wherein the control module is configured to receive the hospital location information via a universal serial bus interface (USB interface).

17. A system in accordance with claim 13, wherein the switching device is connected to a power supply comprised by one or more of the network, the medical device and a battery.

18. A process for an unmanaged switching device for coupling a network and a medical device, the process comprising the steps of:

switching of data packets between the network and the medical device according to a permanently predefined switching instruction without managing an internet protocol address (IP address) of the unmanaged switching device such that the unmanaged switching device is permanently set for sending the same predefined hospital location information to each of one or more medical devices; and sending of the predefined hospital location information of the unmanaged switching device at regular intervals on a first protocol layer and/or on a second protocol layer to the medical device, wherein the switching device is made to appear to be transparent in relation to the network by:
- insertion of the hospital location information in a protocol field of the first or second internet protocol layer in at least some packets received via a first interface and not changing a third switching internet protocol layer or higher internet protocol layer of said at least some packets; and
- receiving packets via the second interface and outputting the received packets unchanged via the first interface.

19. A process according to claim 18, further comprising providing a computer program with a program code for carrying out at least some of the process steps with the program code executed on a computer, on a processor or on a programmable hardware component.

\* \* \* \* \*